(12) United States Patent
Pastrana et al.

(10) Patent No.: US 7,908,120 B2
(45) Date of Patent: Mar. 15, 2011

(54) METHOD AND DEVICE FOR THE EVALUATION OF A QUALITY OF A SIGNAL

(75) Inventors: Ricardo Pastrana, Rennes (FR);
Jean-Louis Blin, Rennes (FR);
Jean-Charles Gicquel, Rennes (FR)

(73) Assignee: France Telecom, Paris (FR)

( * ) Notice: Subject to any disclaimer, the term of this patent is extended or adjusted under 35 U.S.C. 154(b) by 165 days.

(21) Appl. No.: 11/910,152

(22) PCT Filed: Mar. 6, 2006

(86) PCT No.: PCT/FR2006/000494
§ 371 (c)(1),
(2), (4) Date: May 28, 2008

(87) PCT Pub. No.: WO2006/103323
PCT Pub. Date: Oct. 5, 2006

(65) Prior Publication Data
US 2008/0288211 A1    Nov. 20, 2008

(30) Foreign Application Priority Data

Mar. 29, 2005 (FR) ..................................... 05 03051

(51) Int. Cl.
*H04B 15/00* (2006.01)
(52) U.S. Cl. ......... 702/189; 725/143; 702/190; 702/193; 348/180; 348/192
(58) Field of Classification Search .................. 702/189, 702/190, 193; 348/180–181, 192, E7.005, 348/400.1; 725/143
See application file for complete search history.

(56) References Cited

U.S. PATENT DOCUMENTS

| 5,446,492 A | 8/1995 | Wolf et al. | 348/192 |
| 6,285,797 B1 | 9/2001 | Lubin et al. | 382/254 |
| 6,340,994 B1 * | 1/2002 | Margulis et al. | 348/625 |

(Continued)

FOREIGN PATENT DOCUMENTS

EP    0869684    10/1998

(Continued)

OTHER PUBLICATIONS

Schock et al., Spatial and Temporal Pulse Design Considerations for a Marine Sediment Classification Sonar, Jul. 1994, IEEE Publication, vol. 19, No. 3, pp. 406-415.*

International Search Report dated Jun. 21, 2006 for the counterpart foreign patent application No. PCT/FR2006/000494 filed Mar. 6, 2006.

(Continued)

*Primary Examiner* — Mohamed Charioui
*Assistant Examiner* — Elias Desta
(74) *Attorney, Agent, or Firm* — David D. Brush; Westman, Champlin & Kelly, P.A.

(57) ABSTRACT

A method is provided for evaluating quantity PQ representing a quality, as perceived by a recipient, of a signal OFx carrying data representing at least one stimulus intended to be produced on said recipient. The method includes a step of quantification of parameters Sqm and Tqm representing a spatial quality and a temporal quality of the signal, and a step of weighting during which a weighted product of the parameters Sqm and Tqm is computed and raised to a power C strictly below one. The method can be used to take account of a correlation that will be made by a person exposed to the stimulus between its spatial and temporal qualities, in applying an automatic technique in real time.

13 Claims, 3 Drawing Sheets

U.S. PATENT DOCUMENTS 6,496,221 B1  12/2002  Wolf et al. .................... 348/192
2002/0181598 A1  12/2002  Vetro et al. ............... 375/240.27

FOREIGN PATENT DOCUMENTS

WO  WO 2004/054274  6/2004

OTHER PUBLICATIONS

Pastrana, Vidal et al. "Métrique perceptuelle de rupture de fluidité vidéo sans référence."May 26, 2004. Conference Coresa 2004, Lille (FR).

* cited by examiner

METHOD AND DEVICE FOR THE EVALUATION OF A QUALITY OF A SIGNAL

CROSS-REFERENCE TO RELATED APPLICATION

This Application is a Section 371 National Stage Application of International Application No. PCT/FR2006/000494, filed Mar. 6, 2006 and published as WO 2006/103323 A1 on Oct. 5, 2006, not in English.

FIELD OF THE DISCLOSURE

The present disclosure relates to a method of evaluation of a value representing a quality, as perceived by a recipient, of a signal carrying data representing at least one stimulus intended to be produced on said recipient. The method includes a step of quantification of a first parameter and a second parameter respectively representing a spatial quality and a temporal quality of said signal.

BACKGROUND

Such methods are being studied with increasing attention inasmuch as systems are being developed for the targeted distribution of information specifically intended for individuals specifically identified as being recipients, such targeted distribution being novel as compared with the functioning of traditional distribution systems entailing indiscriminate broadcasting of information such as audiovisual programs carried, for example, by radioelectrical signals transmitted by wireless.

Targeted distribution systems whose use is possible in the present state of the art generally make use of a conversion of an analog signal, representing stimuli to be transmitted, into a digital data signal. Said conversion is usually followed by an encoding of said data in order to reduce the volume as far as possible without thereby in any way causing this data to suffer significant deterioration. The encoded data is designed to be transmitted by packets according to standardized transmission protocols such as the Internet IPv4 or IPv6 protocols. It has to be recognized however that, although these packet transmission protocols offer considerable advantages, which is what has made them successful, they are intrinsically a source of deterioration caused by the inevitable loss of certain data packets. Furthermore, whatever the chosen encoding technique, its goal would be a compression that cannot be obtained except by eliminating certain characteristics, deemed to be superfluous, of the stimuli to be encoded. Such compression would inevitably generate losses which could have a negative impact on the perception that a recipient might have of the stimuli transmitted to him in encoded form.

Now an individual who, for example, has subscribed to a service of the supply of audiovisual programs will be contractually entitled to expect a minimum level of quality of the images and sounds that are transmitted to him or her, so that a provider of this supply service would have to ensure that such demands are properly met. This cannot be achieved except by carrying out a relevant evaluation of the quality of the stimuli which will be restored to the recipient after transmission. This evaluation would have to be done in taking account of the specific human features of this recipient's faculties of perception.

Various methods have already been elaborated for the separate evaluation of a spatial quality and a temporal quality of a signal bearing a stimulus, such a moving picture or a sound. These methods make use for example of a group of persons each of whom has to be exposed to said stimulus and is then requested to assign a representative grade to its spatial quality (for example the sharpness of a picture or the absence of distortion in the sound) or temporal quality (for example the fluidity of a moving picture or the absence of a phase shift between two channels of a stereophonic signal) as this person would have perceived it. However, such methods require major logistics and are therefore costly to implement since they require that a sufficient number of persons should be brought together in a controlled environment such as a test laboratory so that a statistical mean of the grades assigned is effectively representative of a mean perception. Furthermore, such methods cannot be used for real-time measurement of quality as perceived by a subscriber at the reception of a stream of stimuli that he would have commanded, so that these methods are not adapted as such to quality control applications in the above-described systems for the targeted distribution of information.

It has also been noted that, in the implementation of such methods, the perception that a person might have of the spatial quality of a stimulus cannot be totally decorrelated from the perception that this very same person has of the temporal quality of said stimulus and vice-versa, during an evaluation of an overall quality as perceived by this person. For example, for a person viewing a video sequence with subjects having movements of wide amplitude, a reduction of an image frequency of said sequence would not improve the total quality as perceived by this person.

A technique of correlation of the spatial and temporal qualities has thus been designed to take account of the correlation made of it by a recipient of the stimuli considered. This technique consists in taking the product between parameters representing these spatial and temporal qualities in isolation. Such a multiplier approach however has not been rigorously validated in the prior art.

Work by the inventors however has demonstrated that a simple multiplication of parameters representing these spatial and temporal qualities in isolation was not enough to take account of the correlation process implemented by the human recipient. This work has made it possible especially to note that the perception by a person of a variation of a quality parameter when the other parameter is kept constant is not linear. This is enough to demonstrate that the multiplier approach described here above is not relevant.

SUMMARY

An aspect of the disclosure relates to method of evaluation of quality of a stimulus which can be used to take account of the correlation made by a person exposed to said stimulus between its spatial and temporal qualities as perceived by this person. Moreover, said method can be implemented automatically and in real time during the sending and/or reception of a signal that is a carrier of data representing said stimulus.

Indeed, in the first of its aspects, an embodiment of the invention pertains to a method of evaluation in accordance with the introductory paragraph that includes a step for computation of a product of said first and second parameters, and is characterized in that it furthermore includes a step of weighting during which a weighted product is computed in raising the product of the first and second parameters to a power below one.

Thus, if Sqm denotes the first parameter representing the spatial quality of the signal and Tqm denotes the second parameter representing the temporal quality of said signal, an embodiment of the invention provides that a measurement quantity Qm1, available for the quality of the signal as perceived by the recipient of the stimulus represented by the signal, can be written according to a first mode of measurement: $Qm1=(Sqm.Tqm)^C$, with $C<1$, for example $C=0.7$. The inventors have indeed carried out validation experiments which have shown that the choice of such a formulation by weighted product of the measurement quantity to mutually correlate the spatial and temporal qualities Sqm and Tqm offers results that are far closer to the mean perception of a statistically significant population than the results obtained by the choice of a simple product between said spatial and temporal qualities. Furthermore, the weighted product can be computed in a purely automatic way and in real time using values of the first and second parameters which themselves may be produced without human intervention according to techniques already known to those skilled in the art. The measurement quantity used in the method of an embodiment of the invention is therefore particularly well suited to quality control applications in systems for the targeted distribution of information as described in the introduction.

The inventors however have noted that this result, which in itself is a considerable improvement over the prior art, can be further improved by the use of a more complex formulation of the measurement quantity, which is then represented in a second model of implementation of an embodiment of the invention by a variable called an interaction variable denoted Qm2 and defined by a linear equation of the weighted product described here above, said interaction variable being possibly written as $Qm2=d.Qm1+e$ where d and e are real numbers, results close to those produced by the above-described mechanisms of human perception being for example obtained with $d=0.2$ and $e=0.9$. This function has the appearance of a linear function but of course is not one since its variable $Qm1=(Sqm.Tqm)^C$ itself follows a law of non-linear evolution as a function of the measured values of spatial and temporal qualities Sqm and Tqm. Choosing this interaction variable Qm2 as a measurement quantity makes it possible to take account more specifically of the particular characteristics of the human mechanisms of perception of stimuli such as moving pictures and sounds.

However, while the results obtained by such a choice of the formulation of the quantity of measurement of quality are in themselves quite satisfactory and offer a remarkable advantage over those obtained in the prior art, the inventors have identified an even more advantageous formulation, which is then represented in a third mode of implementation of an embodiment of the invention by a function of limitation of the interaction variable Qm2 described here above, said function of limitation being monotonic and bounded between a minimum value and a maximum value of perceived quality. Such a limitation corresponds to a reality of functioning, as observed by the inventors, of the human process of analysis of quality of a stimulus, a process in which, below or beyond certain thresholds, variations of quality will not be taken into account. The function of limitation could then consist of one or more linear portions which link stages corresponding to the minimum and maximum values to each other. The limitation function will however advantageously be constituted by a sigmoid type function, mathematically defined as a monotonic function, indefinitely derivable and bounded, which by nature has two asymptotes that could be calibrated so as to be representative of perception thresholds. Such a sigmoid function is indeed well suited, through its form in the vicinity of the asymptotes, to a modeling of the following perception mechanisms which have also been observed by the inventors:

a slight improvement in quality made in a highly deteriorated stimulus is only weakly perceived by a human recipient of said stimulus, a slight improvement in quality made in a substantially deteriorated stimulus is strongly perceived by a human recipient of said stimulus, a high improvement of quality made in a weakly deteriorated stimulus is only weakly perceived by a human recipient of said stimulus.

Various choices of sigmoid function are possible to constitute the function of limitation of variation of the interaction variable described here above. It is possible for example to envisage the use, to this end, of an exponential sigmoid function, defined by a relationship of the type $y=1/(1+\exp(-x))$ or again a tangential sigmoid function defined by a relationship of the type $y=\tan h(x)$.

However, in a preferred embodiment of the invention, the sigmoid function will have the form:

$$y = M\min + \left( \frac{M\max - M\min}{1 + \left(\frac{b}{x}\right)^s} \right),$$

where b and S are real numbers and Mmax and Mmin will respectively be maximum and minimum values of perceived quality corresponding to the above-mentioned perception thresholds, said values possibly being for example chosen to be equal to 90 and to 10 which will therefore be maximum and minimum grades of quality. Thus, the measurement quantity evaluated according to this preferred embodiment, denoted Qm3, will be written as:

$$Qm3 = 10 + \left( \frac{90 - 10}{1 + \left(\frac{b}{Qm2}\right)^s} \right),$$

a formulation that can be used to obtain results very close to those produced by the mechanisms of human perception described here above with $b=80$ and $S=2$.

As explained further above, an embodiment of the invention is also noteworthy in that it can be used to quantify a measurement quantity in real time by automatic analysis of the signal whose quality is measured, and is therefore particularly well suited to quality control operations in systems of targeted distribution of information described in the introduction.

According to another of its aspects, an embodiment of the invention therefore also relates to a method of transmission of data representing at least one stimulus designed to be produced on a recipient, the method including:

a step of encoding said data as a function of at least one configuration parameter, designed to produce an encoded signal adapted to a transmission.

a step of evaluation of a quantity of measurement of quality of the encoded signal, designed to be executed in implementing a method of evaluation compliant with the above description, and a step of setting said configuration parameter as a function of the at least one value of a measurement quantity produced during the execution of the evaluation step.

Such a use of an embodiment of the invention optimizes the value of the configuration parameter or parameters, for example a compression rate or a transmission bit rate, so as to ensure a minimum quality of the stimuli which will be produced on a recipient of the signal thus encoded while at the same time taking account possibly of constraints proper to the system such as the bandwidth that is still available, etc.

According to a first of its hardware aspects, an embodiment of the invention also relates to a device for evaluating a quantity representing a quality, as perceived by a recipient, of a signal bearing data representing at least one stimulus designed to be produced on said recipient, said device including means of quantification of a first parameter and a second parameter respectively representing a spatial quality and a temporal quality of said signal, and means of computation of a product of said first and second parameters, wherein said device furthermore includes means of weighting designed to compute a weighted product in raising the product of the first and second parameters to a power of less than one.

In a particular embodiment of an evaluation device of this kind, the weighting means advantageously include means for determining a value of an interaction variable defined by a linear equation of the weighted product.

In a preferred embodiment of an evaluation device of this kind, the weighting means include means of limitation of variation designed to compute a value of a sigmoid function of the interaction variable.

According to another of its hardware aspects, an embodiment of the invention also relates to a system of transmission of data representing at least one stimulus designed to be produced on a recipient, said system including:
  means of encoding said data in a signal encoded in a format adapted to a transmission,
  a device for the evaluation of a quantity of measurement of quality of the encoded signal, said device being compliant with the above description.

According to a particularly advantageous variant of this hardware aspect, the encoding means being designed for the application to the data of a processing defined by at least one configuration parameter, the system will furthermore include means to set said configuration parameter as a function of at least one value of the measurement quantity produced by the evaluation means.

Such a variant can be used to make a quality control loop in setting up feedback control on the conditions of operation of the data encoding means with the quality level as perceived by the recipient of this data.

The evaluation method can be implemented in various ways, especially in hardware form or software form. An embodiment of the invention therefore also pertains to a computer program product downloadable via a telecommunications network and/or stored in a memory of a central processing unit and/or stored in a memory carrier designed to cooperate with the reader of said central processing unit and designed to enable an evaluation of a quantity representing a quality, as perceived by a recipient, of a signal carrying data representing at least one stimulus designed to be produced on said recipient, said program includes at least one instruction defining a computation of a first parameter and a second parameter respectively representing a spatial quality and a temporal quality of said signal, and at least one instruction defining a computation of a product of said first and second parameters, said computer program product being characterized in that it includes at least one instruction defining a computation of a weighted product by raising the product of the first and second parameters to a power below one.

Such a program could furthermore include instructions defining a procedure of computation of an interaction variable defined by a linear equation of the weighted product, as well as possibly a procedure of limitation of variation of this interaction variable during which a computation is made of a value of a function of limitation of the interaction variable, said limitation function being monotonic and bounded between a minimum value and maximum value of quality perceived and being capable especially of taking the following form:

$$y = M\text{min} + \left( \frac{M\text{max} - M\text{min}}{1 + \left(\frac{b}{x}\right)^s} \right),$$

where Mmax and Mmin are respectively maximum and minimum values of perceived quality and b and S are real numbers.

Finally, according to another of its hardware aspects, an embodiment of the invention also relates to a data carrier in which a software program according to the above description is stored.

The above-mentioned characteristics of one or more embodiments of the invention as well as others shall appear more clearly from the following description of an exemplary embodiment, said description being made with reference to the appended drawings.

DETAILED DESCRIPTION OF ILLUSTRATIVE EMBODIMENTS

Figure 1:
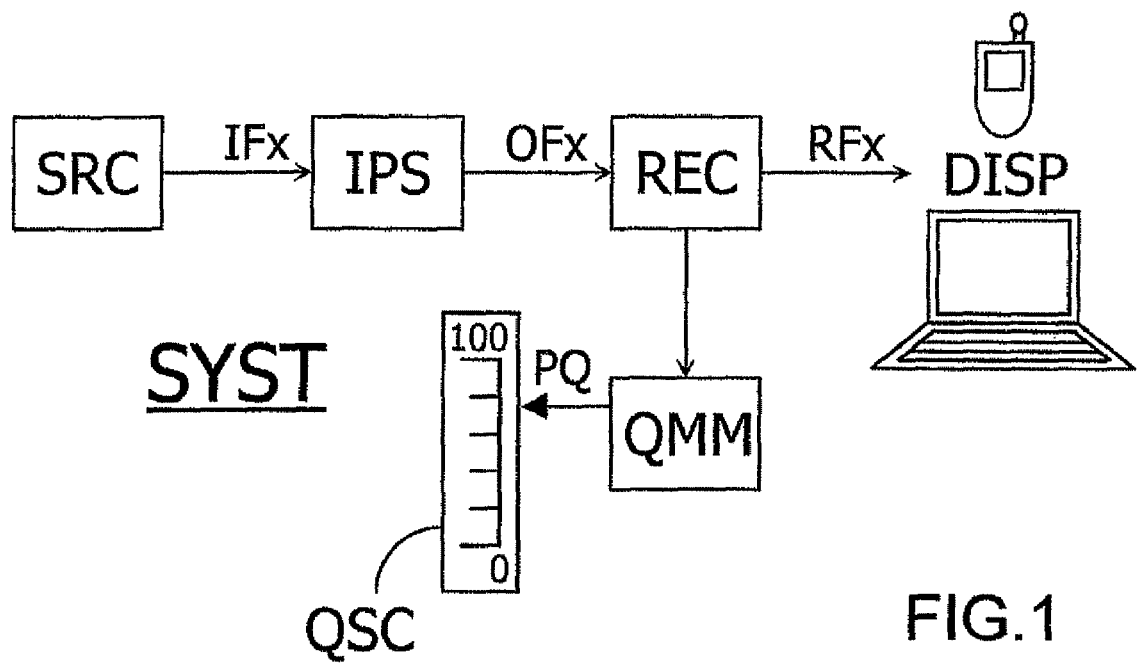
FIG. 1 is a functional diagram representing a system of data transmission in which an embodiment of the invention is used.

FIG. 1 schematically represents a data transmission system SYST that includes means SRC of generation of a digital data stream IFx called an input data stream representing at least one stimulus designed to be produced on a user of the system SYST by means of a terminal DISP consisting for example of a portable telephone or a screen which may or may not be linked to a computer and is preferably provided with at least one speaker, the transmitted stimuli being possibly sound and images either alternatively or in combination. The system SYST includes a distribution means IPS, for example a communications network including a plurality of routers capable of being driven to achieve a targeted dispatch of data included in the input stream IFx to the user's terminal DISP which is connected to a reception module REC designed to receive a digital data stream OFx called an output data stream, delivered by the distribution means IPS and potentially deteriorated by the distribution. In certain modes of implementation of an embodiment of the invention, the reception module REC could be constituted by a decoder capable of communicating with the terminal DISP through a wired or wireless link. In other modes of implementation of an embodiment of the invention, the reception module REC could be integrated into the terminal DISP. The system SYST described here furthermore includes an evaluation device QMM to evaluate a quantity of measurement of quality of the output data stream OFx. This evaluation device QMM is compliant with an embodiment of the invention and capable of producing a measurement signal PQ having a value representing a real-time measurement of the quality perceived by the destination of the output stream OFx by automatic analysis of the content of said stream. In the example shown here in, the value of the measurement signal PQ is related to an absolute scale of values QSC offering a range of variation going from 0 to 100. As will be seen here below, such an absolute and objective quantification of the value perceived by the user of the system SYST will, among other advantages, enable an optimization of the generation of the data stream sent to the user of the system SYST, designed to ensure minimum quality, for the user, of the stimuli that will be produced on him.

Figure 2:
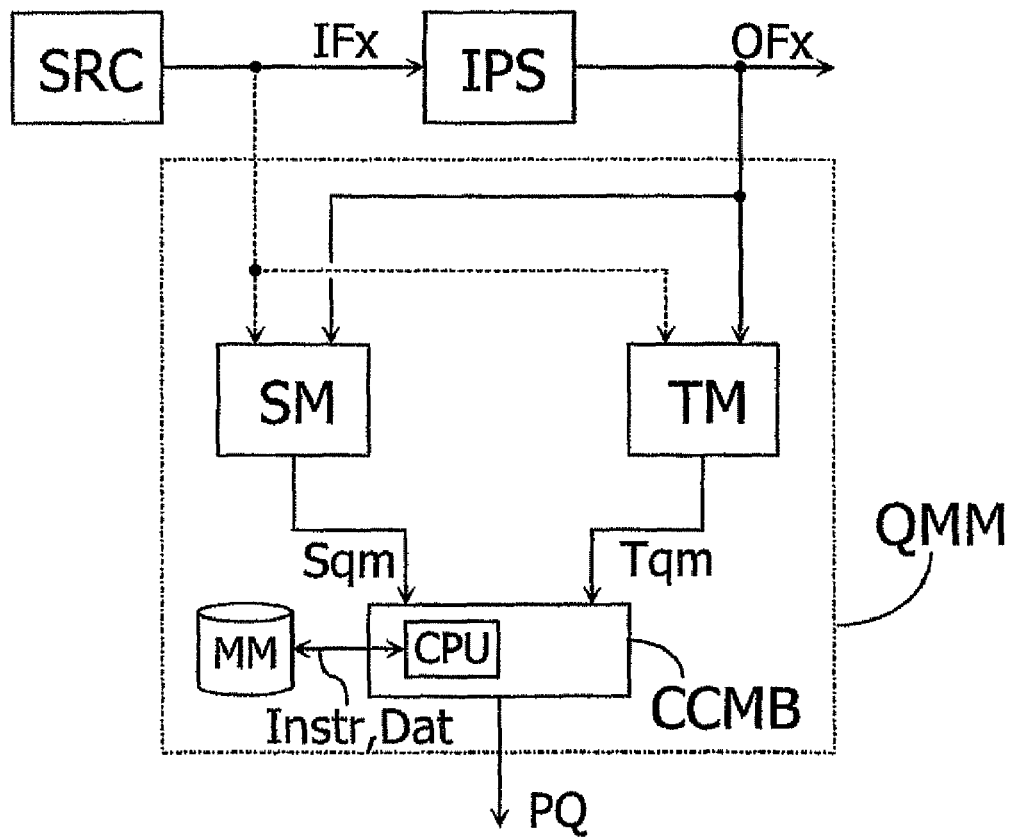
FIG. 2 is a functional diagram representing means of evaluation capable of being implemented in such a system.

FIG. 2 illustrates a possible embodiment of the device QMM for the evaluation of a quantity of measurement of quality of the output data stream OFx which could, in the example described herein, be directly integrated into the reception module mentioned here above. This evaluation device QMM includes first and second quantification modules SM and TM of first and second parameters Sqm and Tqm respectively representing a spatial quality (for example the sharpness of a picture or the absence of distortion of a sound) and a temporal quality (for example the fluidity of a moving picture or an absence of phase shift between two channels of a stereophonic signal) of the signal conveying the output data stream OFx. These first and second parameters will preferably be quantified with reference to a same scale of values, for example ranging from 0 to 100, so that the parameters are mutually consistent. In the particular embodiment shown herein, each of the first and second quantification modules SM and TM is designed to receive the data stream OFx. A data channel shown in dashes could be planned, as an option, to convey the input data stream IFx to the quantification modules SM and TM. This input data stream IFx could then be used therein as a comparison reference, permitting for example a correlation between the input IFx and output OFx streams which will enable quantification of the deterioration, marked by a lack of correspondence between said streams. In other embodiments not shown herein, the output data stream OFx could contain watermark indicators or reference data sequences which will be used by the quantification modules SM and TM instead of the data stream IFx to carry out correlations with theoretically corresponding portions of the data stream OFx, which will give these quantification modules total operating autonomy relative to the generation means SRC. Such techniques are themselves known to those skilled in the art.

In accordance with an embodiment of the invention, the evaluation device QMM includes weighting means CCMB designed to deliver a measurement signal PQ having a value representing a real-time measurement of the quality perceived by the recipient of the output stream OFx. This value is obtained by automatic analysis of the content of said stream. According to the embodiment of the invention which will have been chosen, the measurement signal PQ could be representative of the value of a weighted product Qm1, or the value of an interaction variable Qm2, or the value of a sigmoid function Qm3 of this interaction variable with the corresponding advantages described in the introduction. To define the formulation of the measurement quantity to be used, the weighting means CCMB could include a programmable logic circuit appropriately configured to perform the computations required by the mode of implementation chosen by means of a wired logic. This solution offers high processing speed but is reconfigurable only with difficulty. The weighting means CCMB will thus preferably include a central processing unit CPU designed to receive instructions Instr and data Dat stored in a data carrier MM defining the computation steps whose execution by the central processing unit CPU will enable the weighting means CCMB to generate the desired measurement signal PQ. These instructions Instr could be easily modified if it proves to be necessary and could be presented in the form of several sets of alternative instructions enabling the selection, possibly in real time, of the values of the variables Qm1, Qm2 or Qm3 for which the measurement signal PQ would be representative.

Such sets of instructions will then form software programs which could be downloaded into the data carrier MM if it is rewritable, as is the case for example for a hard disk drive, a CD-RW, a DVD-RAM or a magneto-optical disk. The data carrier MM could furthermore be detachable and could consist for example of a read-only disk of the CD-ROM or DVD-ROM type furnished to the system user by a program supply services provider.

Figure 3:
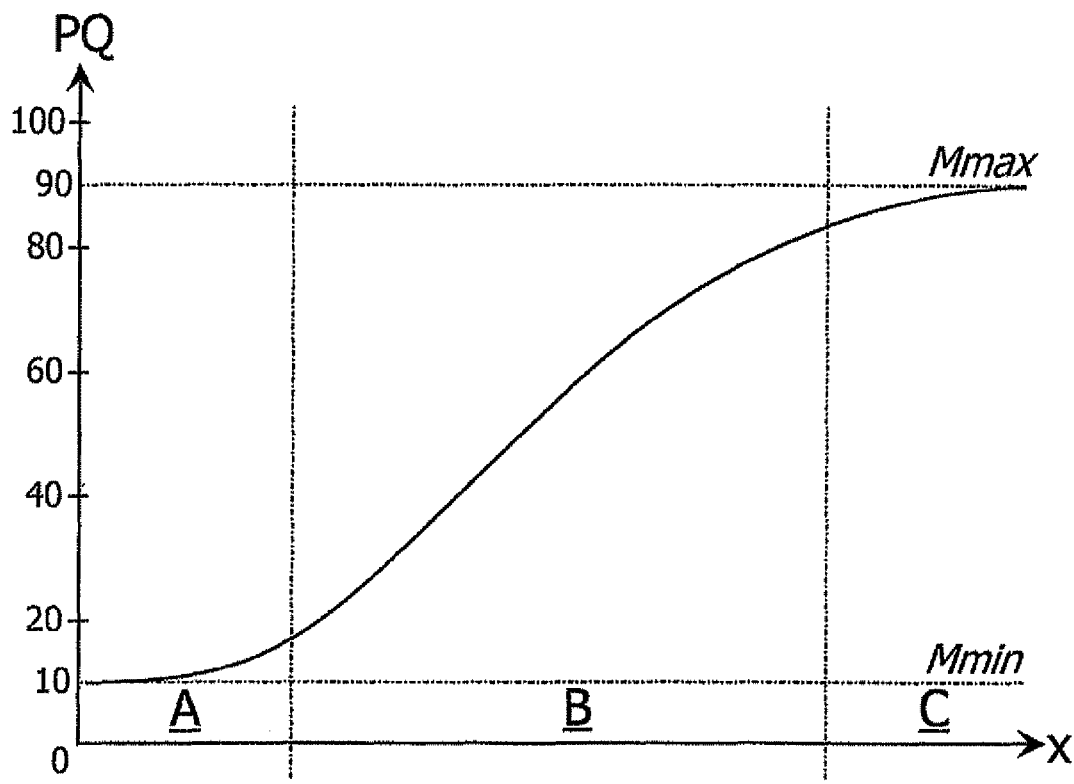
FIG. 3 is a transfer curve illustrating a preferred mode of correlation of parameters representing a spatial quality and a temporal quality of signals transmitted in such a system.

FIG. 3 represents an example of a limitation function PQ=f(x) which represents the evolution of a measurement signal PQ defined by the following formulae:

$$PQ = 10 + \left( \frac{90 - 10}{1 + \left(\frac{80}{x}\right)^2} \right)$$

and $x=d.(Sqm.Tqm)^C+e$, where C=0.7, d=0.2 and e=0.9, Sqm and Tqm being parameters respectively representing a spatial quality (example the sharpness of a picture or the absence of distortion of the sound) and a temporal quality (for example the fluidity of a moving picture or an absence of phase shift between two channels of a stereophonic signal) of a signal whose quality is represented by the quality of the measurement signal PQ.

The measurement quantity represented by this measurement signal PQ thus corresponds to the quantity Qm3 defined further above. It is obtained by computing the value of a function of limitation f(x) of the interaction variable Qm2 represented by the variable x, said limitation function f(x) being monotonic and bound between a minimum value and a maximum value. In this particular example, the function f(x) is a sigmoid type function, i.e. it is defined as an increasing function, indefinitely derivable and bounded. This particular type enables a limitation to be achieved of the variation of the interaction variable $Qm2=d.(Sqm.Tqm)^C+e$ between maximum values Mmax=90 and Mmin=10 expressed by two asymptotes representing these values which constitute perception thresholds, below or beyond which variations in quality will not be taken into account.

In its particular expression given here above, the function f(x) defining the evolution of the measurement signal PQ, through the form of its evolution in the vicinity of the asymptotes Mmax=90 and Mmin=10, proves to be specially adapted to a modeling of the following mechanisms of perception which have also been observed by the inventors:

a low improvement of quality made in a highly deteriorated stimulus (see range of variation A) is only weakly perceived by a human receiver of said stimulus;

a low improvement of quality made in a substantially deteriorated stimulus (see range of variation B) is strongly perceived by a human receiver of said stimulus;

a high improvement in quality made in a weakly deteriorated stimulus is only weakly perceived by a human receiver of said stimulus (see range of variation C).

Figure 4:
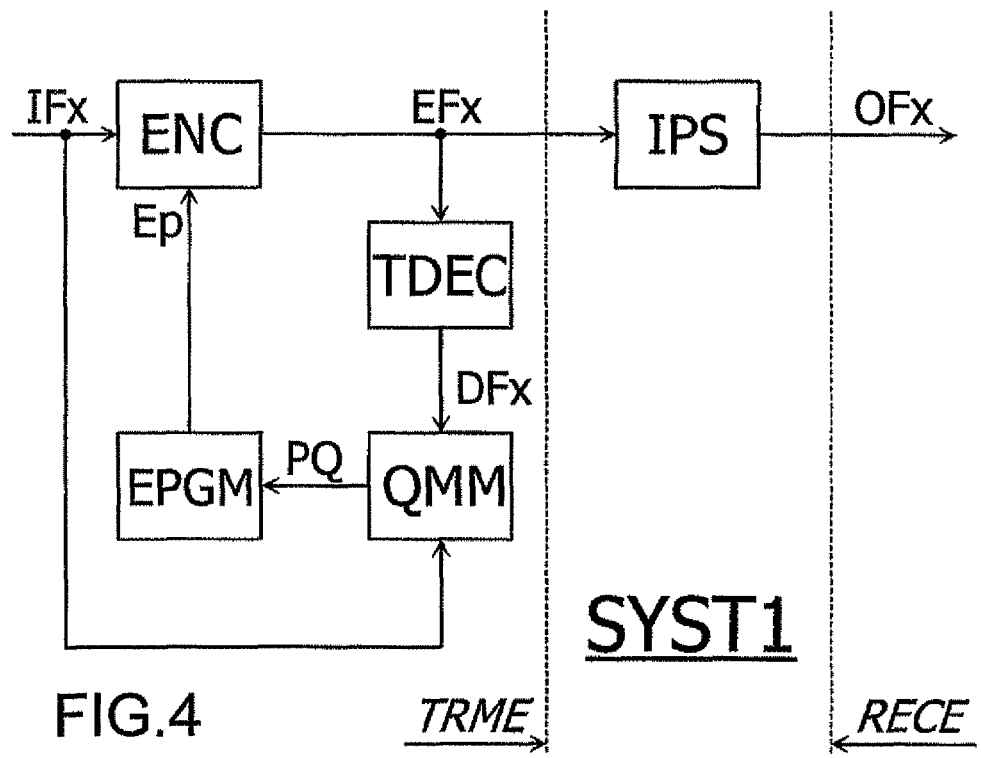
FIG. 4 is a functional diagram representing a data transmission system in which a first variant of an embodiment of the invention is used.

FIG. 4 is a schematic view of a data transmission system SYST1 according to a first variant of an embodiment of the invention. This system SYST1 is designed for the transmission, between a sender part TRME and a receiver part RECE, of a data stream representing at least one stimulus. To this end, an input data stream IFx is encoded by encoding means ENC in an encoded data stream EFx designed to be transmitted via a distribution means IPS to the receiver part RECE which will receive it in the form of an output data stream OFx. The encoding means are designed to be configured by means of at least one configuration parameter Ep, for example a compression rate or a transmission bit rate whose value, determined by a generator of encoding parameters EPGM, will define the conditions in which the data encoding is done. The system SYST1 represented here furthermore includes a decoder called a sending decoder TDEC identical to a reception decoder, not shown herein, with which the receiver part RECE is provided, with a view to the decoding of the output stream OFx. Finally, the system SYST1 includes a device QMM for the evaluation of a measurement quantity representing the quality of the encoded data stream EFx, said device QMM being compliant with the above description and being designed to produce a measurement signal PQ.

This first variant of an embodiment of the invention can be used to carry out an evaluation of the quality of the encoded signal in providing the encoded data stream EFx to the sending decoder which will produce a decoded data stream DFx representing the data stream which will be effectively used by the receiver part RECE to produce, on the user of the system SYST1, the stimulus intended for him. In the example shown herein, a comparative analysis between the decoded data stream DFx and the input data stream will produce a value of the measurement signal PQ which will drive the generator of encoding parameters EPGM. This is done to optimize the value of the configuration parameter Ep so as to ensure minimum quality for the stimuli that will be produced on the recipient of the output signal OFx and, at the same time, take account of constraints if any proper to the system such as the bandwidth still available, etc, which could also be communicated in the form of signals, not shown herein, to the generator of encoding parameters EPGM. For example, if it appears that the quality as represented by the value of the measurement signal PQ is insufficient relative to the minimum qualities required, the value of a configuration parameter Ep defining a compression rate would be lowered so that said compression generates fewer information losses.

Figure 5:
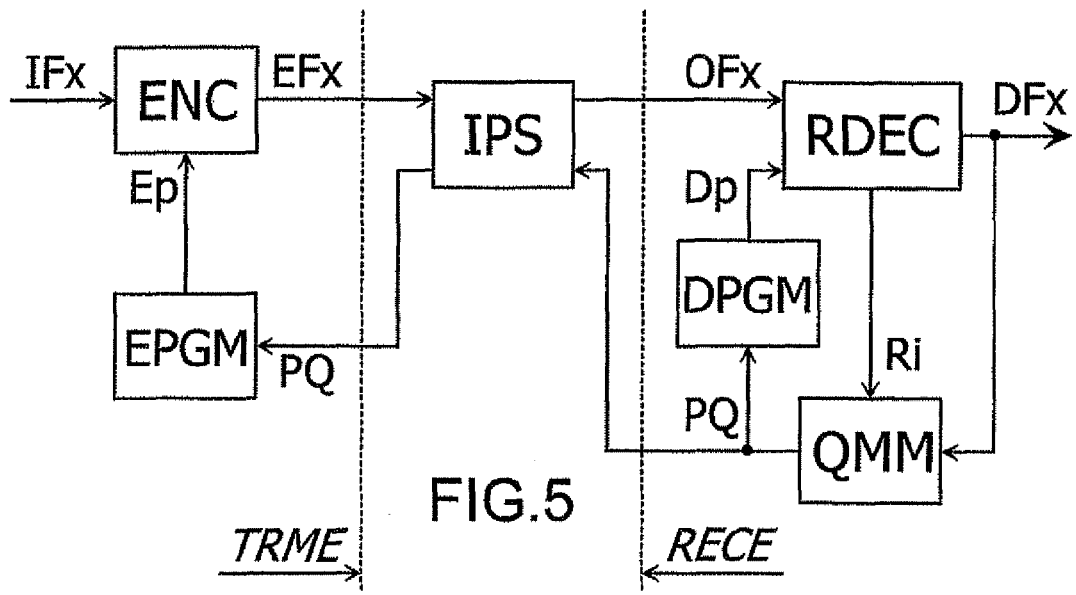
FIG. 5 is a functional diagram representing a data transmission system in which a second variant of an embodiment of the invention is used.

FIG. 5 is a schematic view of a data transmission system SYST2 according to a second variant of an embodiment of the invention. This system SYST2 is designed for the transmission, between a sender part TRME and a receiver part RECE, of a data stream representing at least one stimulus. This system SYST2 comprises elements common with those described here above, said common elements then bearing the same reference signs. The system SYST2 represented here includes a reception decoder RDEC with which the reception part RECE is provided with a view to decoding the output stream OFx. The system SYST2 furthermore includes an evaluation device QMM for the evaluation of a measurement quantity representing the quality of a decoded data stream DFx produced by the reception decoder RDEC, and therefore the quality of the encoded data stream EFx. Said device QMM is compliant with the above description and is designed to produce a measurement signal PQ.

In the example shown herein, it is difficult to perform a comparative analysis of the decoded data stream DFx and of the input data stream IFx in the reception part RECE where said input stream is unavailable, so that the output signal OFx will preferably contain reference indicators Ri which will be analyzed, using a technique known per se to those skilled in the art, by the modules of quantification of the spatial and temporal qualities included in the QMM device. This device could then produce a value of the measurement signal PQ which will drive on the one hand the encoding parameters generator EPGM to which this value will be transmitted in return via the distribution means IPS and, on the other hand, a decoding parameters Dp generator DPGM which will enable optimization of the configuration of the reception decoder RDEC with a view to further improving the quality of the stimuli that would be produced on the recipient of the decoded data stream DFx in adjusting for example the size of a buffer memory or the selectivity of an error filter used during the decoding.

Figure 6:
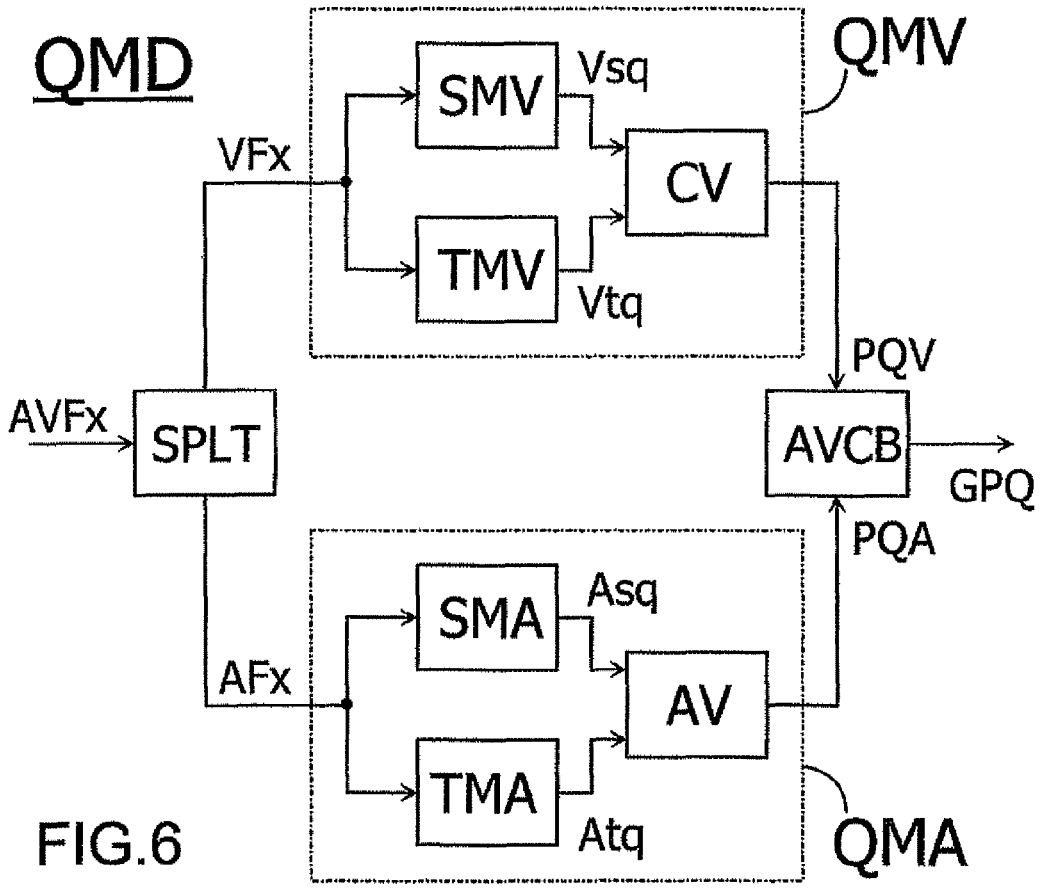
FIG. 6 is a functional diagram illustrating a possible application of the invention to the evaluation of the quality of audiovisual programs.

FIG. 6 schematically represents a module QMD for evaluating the quality of a data stream AVFx representing both audio stimuli and video stimuli. Such a stream is thus a carrier of an audiovisual program. This evaluation module QMD contains a stream separator SPLT designed for the extraction, from the data stream AVFx, of a first stream VFx and a second stream AFx respectively carrying video data and audio data, the evaluation module QMD including first and second evaluation devices QMV and QMA each designed to evaluate a quantity PQV and PQA representing a quality, as it would be perceived in isolation by a recipient, of said first and second streams VFx and AFx. To this end, each of the first and second evaluation devices QMV and QMA is similar to the evaluation device described further above and includes weighting means CV and AV, respectively designed for the mutual correlation of the values of parameters of spatial (Vsq,Vtq) and temporal (Asq,Atq) qualities produced by corresponding quantification modules (SMV,TMV) and (SMA, TMA), each correlation being done in raising the products Vsq.Vtq and Asq.Atq, computed between the values of the parameters of spatial and temporal qualities, to powers C1 and C2 smaller than one. As explain further above, each correlation could furthermore include a step to compute an interaction variable defined by a linear equation of a corresponding weighted product $(Vsq,Vtq)^{C1}$ et $(Asq,Atq)^{C2}$ and, optionally, a step to limit the variation of said interaction variable by implementing a sigmoid function of said interaction variable.

Finally, the quality evaluation module QMD comprises a mixer AVCB capable of receiving the values of the quantities PQV and PQA of measurement of quality of the first and second streams VFx and AFx of video data and audio data, and of combining these values according to a technique known to those skilled in the art in order to provide a signal GPQ representing an overall evaluation of the quality of the data stream AVFx as it will be perceived by a spectator of the audiovisual program defined by this data. This signal GQP could thus be expressed in the following form:

GPQ=$\alpha$.PQV+$\beta$.PQA+$\gamma$.(PQV.PQA)+$\epsilon$, where $\alpha$, $\beta$, $\gamma$ and $\epsilon$ are real numbers obtained once and for all by statistical analysis of perceptions of a group of persons exposed in a laboratory to variations in audio and video quality of an audiovisual stimulus conveyed by a data stream AVFx.

Although the present disclosure have been described with reference to one or more examples, workers skilled in the art will recognize that changes may be made in form and detail without departing from the spirit and scope of the disclosure and/or the appended claims.

The invention claimed is:

1. Method of evaluation of a quantity representing a quality, as perceived by a recipient, of a signal carrying data representing at least one stimulus intended to be produced on said recipient, wherein said method comprises:
reception of said signal by an evaluation device;
quantifying, by said evaluation device, a first parameter and a second parameter respectively representing a spatial quality and a temporal quality of said signal;
computing a product of said first and second parameters;

weighting during which a weighted product is computed in raising the product of the first and second parameters to a power strictly below one; and delivering, by said evaluation device, a quantity representing a quality, said quantity being based on the computed weighted product.

2. Method according to claim 1, and further comprising determining a value of an interaction variable defined by a linear equation of the weighted product.

3. Method according to claim 2, and further comprising limiting variation during which a value of a function of limitation of the interaction variable is computed, said function of limitation being monotonic and bounded between a minimum value and a maximum value of perceived quality.

4. Method according to claim 3, wherein said limitation function has the form:

$$y = M\min + \left(\frac{M\max - M\min}{1 + \left(\frac{b}{x}\right)^s}\right),$$

where y is the evolution of a measurement signal, x is the computation of spatial and temporary quality, and where Mmax and Mmin are respectively maximum and minimum values of perceived quality and b and S are real numbers.

5. Method of claim 1 and further comprising a method of transmission of data representing at least one stimulus designed to be produced on a recipient, the method including:
encoding said data as a function of at least one configuration parameter, designed to produce an encoded signal adapted to a transmission,
evaluating a quantity of measurement of quality of the encoded signal, designed to be executed in implementing a method of evaluation according to claim 1, and
setting said configuration parameter as a function of the at least one value of a measurement quantity produced during the execution of the evaluation step.

6. Device for evaluating a quantity representing a quality, as perceived by a recipient, of a signal carrying data representing at least one stimulus designed to be produced on said recipient, said device including:
means of quantification of a first parameter and a second parameter respectively representing a spatial quality and a temporal quality of said signal,
means of computation of a product of said first and second parameters, and
means of weighting designed to compute a weighted product in raising the product of the first and second parameters to a power strictly below one.

7. Device according to claim 6, wherein the weighting means include means for determining a value of an interaction variable defined by a linear equation of the weighted product.

8. Device according to claim 7, wherein the weighting means include means of limitation of variation designed to compute a value of a function of limitation of the interaction variable, said function of limitation being monotonic and bounded between a minimum value and a maximum value of perceived quality.

9. System of transmission of data representing at least one stimulus designed to be produced on a recipient, said system including:
means of encoding said data in a signal encoded in a format adapted to a transmission, the device for the evaluation of a quantity of measurement of quality of the encoded signal of claim 6.

10. Data transmission system according to claim 9, wherein said encoding means being designed for the application to the data of a processing defined by at least one configuration parameter, the system furthermore includes means to set said configuration parameter as a function of at least one value of the measurement quantity produced by the evaluation means.

11. A non-transitory computer-readable medium containing a computer program stored therein for causing a computer to perform a method of evaluating a quantity representing a quality, as perceived by a recipient, of a signal carrying data representing at least one stimulus intended to be produced on said recipient, when the program is executed by the computer, wherein the method comprises:
quantifying a first parameter and a second parameter respectively representing a spatial quality and a temporal quality of said signal;
computing a product of said first and second parameters;
weighting during which a weighted product is computed in raising the product of the first and second parameters to a power strictly below one;
determining a value of an interaction variable defined by a linear equation of the weighted product;
limiting variation during which a value of a function of limitation of the interaction variable is computed, said function of limitation being monotonic and bounded between a minimum value and a maximum value of perceived quality.

12. A non-transitory computer-readable medium containing a computer program stored therein for causing a computer to perform a method of evaluating a quantity representing a quality as perceived by a recipient, of a signal carrying data representing at least one stimulus intended to be produced on said recipient, when the computer program is executed on the computer, wherein the method comprises:
quantifying a first parameter and a second parameter respectively representing a spatial quality and a temporal quality of said signal;
computing a product of said first and second parameters;
weighting during which a weighted product is computed in raising the product of the first and second parameters to a power strictly below one;
determining a value of an interaction variable defined by a linear equation of the weighted product; and
limiting variation during which a value of a function of limitation of the interaction variable is computed, said function of limitation being monotonic and bounded between a minimum value and a maximum value of perceived quality.

13. Module for the reception of a signal carrying data representing at least one stimulus designed to be produced on a recipient, the module comprising means of evaluation of a quantity representing a quality, as perceived by said recipient, said evaluation means including:
means of quantification of a first parameter and a second parameter respectively representing a spatial quality and a temporal quality of said signal,
means of computation of a product of said first and second parameters, and
means of weighting a product by raising the product of the first and second parameters to a power strictly below one.

* * * * *